Patented May 1, 1934

UNITED STATES PATENT OFFICE 1,957,084

ANTHRAQUINONE DERIVATIVE

Berthold Stein, Mannheim, Germany, assignor to General Aniline Works, Inc., New York, N. Y., a corporation of Delaware No Drawing. Application August 12, 1932, Serial No. 628,591. In Germany August 28, 1931

7 Claims. (Cl. 260—57)

The present invention refers to chlor-cyananthraquinones and a process of producing same.

I have found that chlor-cyananthraquinones are obtained by treating cyananthraquinone-sulphonic acids with agents capable of supplying chlorine in aqueous media, at a temperature above 80° C. and in the presence of water.

As initial material any cyananthraquinone-sulphonic acid may be employed, for example 1-cyananthraquinone-2-sulphonic acid, 2-cyananthraquinone-6-sulphonic acid, 2-cyananthraquinone-3-sulphonic acid or poly-cyananthraquinone-sulphonic acids such as 1.5-dicyananthraquinone-2.6-sulphonic acid. Also cyananthraquinone-sulphonic acids containing already halogen may be used, for example 1-cyan-4-chlor-anthraquinone-2-sulphonic acid or 1-cyan-4-brom-anthraquinone-2-sulphonic acid. The said materials may be employed in the form of water-soluble salts, for example the alkali metal and ammonium salts, or as free acids.

The reaction is carried out at temperatures above 80° C. in the presence of liquid water; the upper limit of the temperature is therefore the critical temperature of the water. The quantity of water employed may vary within wide limits; in the treatment of comparatively difficultly soluble materials it will be advantageous to use comparatively great amounts of water. Preferably the reaction is carried out at about 100° C. Increased pressure may be used; generally, however, it is more suitable to work under ordinary pressure. It is preferable to effect the reaction in acid aqueous media.

As suitable agents capable of supplying chlorine in an aqueous medium may be mentioned for example chlorine, alkali metal chlorates in the presence of hydrochloric acid, or persulphates in the presence of hydrochloric acid.

The products obtainable according to the present invention are valuable intermediate products for the preparation of dyestuffs.

The following examples will further illustrate the nature of this invention but the invention is not restricted to these examples. The parts are by weight.

Example 1

100 parts of sodium 1-cyananthraquinone-2-sulphonate obtainable from 1-aminoanthraquinone-2-sulphonic acid by way of Sandmeyer's reaction are dissolved in 6000 parts of hot water. 600 parts of sulphuric acid of 50° Bé. and 480 parts of concentrated hydrochloric acid are added and then a solution of 60 parts of sodium chlorate in 500 parts of water is allowed to flow during the course of a few hours into the resulting solution heated to 95° C. The temperature of the reaction mixture is then kept at from 95° to 100° C. until the filtrate of a sample withdrawn and filtered while hot no longer yields a precipitate of unchanged initial material upon the addition of common salt. The whole is then filtered by suction while hot, the filter cake washed until neutral with hot water and a reaction product is obtained in a practically theoretical yield in the form of fine pale yellow crystals. The nitrogen content of 5.2 per cent and the chlorine content of 13.5 per cent determined by analysis corresponds well with the values of 5.2 per cent of nitrogen and 13.3 per cent of chlorine calculated for the hitherto unknown 1-cyan-2-chlor-anthraquinone. The compound crystallizes from nitrobenzene in the form of almost white leaflets having a melting point of from 284° to 285° C. which dissolve in sulphuric acid giving a yellow coloration. The color of the vat is green.

1-cyan-2.4-dichlor-anthraquinone or 1-cyan-2-chlor-4-brom-anthraquinone may be obtained from 1-cyan-4-brom-anthraquinone-2-sulphonic acid or 1-cyan-4-brom-anthraquinone-2-sulphonic acid, the said cyano compounds being obtainable from the corresponding amino compounds by way of Sandmeyer's reaction.

Example 2

50 parts of 2-cyananthraquinone-6-sulphonic acid sodium salt (obtainable by diazotizing 2-amino-anthraquinone-6-sulphonic acid sodium salt and treating the resulting diazo compound with cuprous cyanide according to Sandmeyer) are dissolved in 3000 parts of hot water, 360 parts of concentrated hydrochloric acid and a solution of 30 parts of sodium chlorate in 300 parts of water are added and the whole heated to from 95° to 100° C. until the initial material can practically no longer be detected. The insoluble precipitate is then filtered off by suction and washed until neutral. By crystallization, for example from benzyl cyanide or nitrobenzene, long thin almost white prisms having a melting point of from 304° to 306° C. are obtained. The reaction product thus obtained, 2-cyan-6-chlor-anthraquinone, dissolves in sulphuric acid giving a yellow coloration and in alkaline sodium hydrosulphite solution giving an olive coloration.

Example 3

10 parts of 1-cyananthraquinone-2-sulphonic acid sodium salt are dissolved in 500 parts of boiling water and a stream of chlorine is led through the boiling clear solution while stirring vigorously. After some time the liquid commences to become cloudy by reason of the precipitation of glittering crystals. The leading in of chlorine is continued until initial material can no longer be detected in the solution. The precipitate is then filtered off by suction, washed until neutral and dried. The reaction product is identical with that obtained according to Example 1.

Example 4

120 parts of concentrated hydrochloric acid and 75 parts of sulphuric acid of 50° Bé. strength are added to a solution of 12 parts of 2-cyananthraquinone-3-sulphonic acid sodium salt obtainable from the corresponding amino compound by way of Sandmeyer's reaction in 1000 parts of hot water and then a solution of 12 parts of sodium chlorate in 80 parts of water is allowed to flow in during the course of a few hours while stirring gently at from 95° to 100° C. The solution soon becomes clouded by fine, almost white crystals. The reaction mixture is kept at from 95° to 100° C. until the filtrate of a sample withdrawn and filtered while hot no longer yields a precipitate of initial material when common salt is added. The whole is then filtered by suction, the precipitate washed with hot water until neutral and dried. By crystallization from organic solvents, such as trichlorbenzene, pyridine, nitrobenzene and the like the reaction product, 2-cyan-3-chlor-anthraquinone, is obtained in the form of yellowish white leaflets having a melting point of about 284° C. The compound dissolves in sulphuric acid to give a yellow coloration and in alkaline hydrosulphite solution to give a green coloration.

Example 5

20 parts of concentrated hydrochloric acid are added to a solution of 5 parts of 1-cyananthraquinone-2-sulphonic acid potassium salt in 300 parts of boiling water. In the course of some hours 50 parts of a solution of potassium persulphate saturated in the cold are added at 95° to 100° C. Then the said temperature is maintained for some hours. The reaction product is filtered off by suction and washed with boiling water. The product obtained in the form of fine, nearly white crystals is identical with the reaction product obtained according to Example 1.

The same product is obtained if instead of the solution of persulphate 30 parts of an aqueous solution of sodium hypochlorite containing 10 per cent of active chlorine are employed.

Example 6

50 parts of 1.5-dicyananthraquinone-2.6-disulphonic acid sodium salt are dissolved in 10,000 parts of water and 300 parts of concentrated hydrochloric acid and 200 parts of sulphuric acid of 50° Bé. strength are added to the solution obtained. Then the mixture is heated at 95° to 100° C. and a solution of 75 parts of sodium chlorate in 500 parts of water is added by and by, preferably in the course of 24 hours. The said temperature is maintained until no further increase in the reaction product which separates in the form of fine particles occurs. The reaction product is filtered off by suction and washed with hot water; it is obtained in a form of fine paleyellow crystals, which may be recrystallized, for example, from nitrobenzene and which dissolve in sulphuric acid, giving a yellow coloration and in an alkaline solution of hydrosulphite giving a green coloration. 2.6-dichlor-anthraquinone-1.5-dicarboxylic acid is obtained by saponifying the reaction product.

Example 7

20 parts of 1-cyananthraquinone-2-sulphonic acid sodium salt are dissolved in 1000 parts of water. In a vessel resistant to pressure chlorine is introduced into the solution obtained until the pressure amounts to 10 atmospheres; the vessel is then heated for some hours at 120° to 125° C. The small crystals precipitated from the solution are filtered off by suction, washed until they are neutral and dried. The reaction product is identical with that obtained according to Example 1.

Example 8

30 parts of 1-cyananthraquinone-2-sulphonic acid chloride (obtainable from 1-cyananthraquinone-2-sulphonic acid sodium salt by treatment with phosphorus pentachloride in the heat and crystallization from nitrobenzene) are heated to boiling for several hours with 1500 parts of water whereby a solution of 1-cyananthraquinone-2-sulphonic acid containing a small quantity of hydrochloric acid is obtained. Chlorine is introduced into the said solution at 98° to 100° C. while stirring vigorously, until no further increase of the precipitate, the formation of which begins soon, occurs. The reaction product is filtered off by suction while the reaction mixture is still hot, washed until it is neutral and dried. The reaction product is identical with that obtained according to Example 1.

What I claim is:—

1. A process of producing chlor-cyananthraquinones which comprises treating a cyananthraquinone-sulphonic acid with an agent, capable of supplying chlorine in an aqueous medium, at temperatures above 80° C. and in the presence of water.

2. A process of producing chlor-cyananthraquinones which comprises treating a cyananthraquinone-sulphonic acid in the form of a water-soluble salt with an agent, capable of supplying chlorine in an aqueous medium, at temperatures above 80° C. and in the presence of water.

3. A process of producing chlor-cyananthraquinones which comprises treating a cyananthraquinone-sulphonic acid with an agent, capable of supplying chlorine in an aqueous medium, at temperatures above 80° C. in an acid aqueous medium.

4. A process of producing chlor-cyananthraquinones which comprises treating a cyananthraquinone-sulphonic acid in the form of a water-soluble salt with an agent, capable of supplying chlorine in an aqueous medium, at temperatures above 80° C. in an acid aqueous medium.

5. 2-chlor-1-cyananthraquinone crystallizing from nitrobenzene in the form of almost white leaflets, dissolving in sulphuric acid giving a yellow coloration and giving a green vat.

6. 2.6-dichlor-1.5-dicyananthraquinone crystallizing from nitrobenzene in the form of pale yellow crystals, dissolving in sulphuric acid giving an orange yellow coloration, giving a green vat and being capable of yielding 2.6-dichloranthraquinone-1.5-dicarboxylic acid by saponification.

7. Anthraquinones containing a chlorine atom in the 2-position and a cyano group in the 1-position which may contain further substituents selected from the group consisting of chlorine and cyano groups, dissolving in concentrated sulphuric acid giving a yellow coloration and giving a green vat.

BERTHOLD STEIN.